(12) United States Patent
Guzzella et al.

(10) Patent No.: US 8,997,488 B2
(45) Date of Patent: Apr. 7, 2015

(54) TURBOCHARGED RECIPROCATING PISTON ENGINE HAVING A CONNECTED PRESSURE TANK FOR BRIDGING TURBO LAG, AND METHOD FOR OPERATING SAID ENGINE

(75) Inventors: Lino Guzzella, Uster (CH); Christian Dönitz, Markdorf (DE); Christopher H. Onder, Weisslingen (CH); Christoph Voser, Zurich (CH)

(73) Assignee: ETH Zürich, Zürich (CH)

( * ) Notice: Subject to any disclaimer, the term of this patent is extended or adjusted under 35 U.S.C. 154(b) by 247 days.

(21) Appl. No.: 13/388,942

(22) PCT Filed: Aug. 3, 2010

(86) PCT No.: PCT/EP2010/004733
§ 371 (c)(1),
(2), (4) Date: Mar. 23, 2012

(87) PCT Pub. No.: WO2011/015336
PCT Pub. Date: Feb. 10, 2011

(65) Prior Publication Data
US 2012/0186249 A1    Jul. 26, 2012

(30) Foreign Application Priority Data

Aug. 3, 2009 (EP) .................................. 09009995
Sep. 10, 2009 (CH) ................................... 1409/09

(51) Int. Cl.
*F02B 33/44* (2006.01)
*F02D 13/02* (2006.01)
(Continued)

(52) U.S. Cl.
CPC ............ *F02D 13/0276* (2013.01); *F02B 21/00* (2013.01); *F02B 29/00* (2013.01);
(Continued)

(58) Field of Classification Search
CPC .......... F02B 37/04; F02B 21/00; F02B 29/00; F02B 39/12; F02B 39/04; F02B 37/16; F02B 37/18; F02D 35/023; F02D 41/007; F02D 13/0276; F02M 2023/008; Y02T 10/144; Y02T 10/18; Y02T 10/146

USPC .................................. 60/605.1, 611; 123/316
See application file for complete search history.

(56) References Cited

U.S. PATENT DOCUMENTS 1,013,528 A    1/1912   Broderick
2,995,890 A    8/1961   Dolza
(Continued)

FOREIGN PATENT DOCUMENTS

AU    200165616 A  *  4/2002  ............. F02B 75/02
DE    102 39 110 A1     3/2004
(Continued)

OTHER PUBLICATIONS

Dönitz et al., "Realizing a Concept for High Efficiency and Excellent Driveability: The Downsized and Supercharged hybrid Pneumatic Engine," SAE Tech. Paper Series, Society of Automotive Engineers, Apr. 2009, No. 2009-01-1326, pp. 1-15.

*Primary Examiner* — Thai Ba Trieu
*Assistant Examiner* — Ngoc T Nguyen
(74) *Attorney, Agent, or Firm* — Pauley Petersen & Erickson (57) ABSTRACT

The present invention relates to a turbocharged reciprocating piston engine, and to a method for operating said engine. The combustion chamber includes at least one inlet valve (10), one outlet valve (13) and at least one additional charging valve (11), for the additional feed of compressed air to bridge the turbo lag, that are each operatively connected to the crankshaft via a camshaft and the operative connection of the charging valves to the crankshaft can be deactivated, with the result that the at least one charging valve (11) remains closed. An approximately stoichiometric combustion mixture is achieved by a turbocharger (4) and a throttle valve (8). By displacement of the opening instant of the charging valves (11), air can be pumped from the cylindrical combustion chambers into the compressed air tank (14). An additional compressor (24) can likewise deliver air into the compressed air tank (14).

16 Claims, 6 Drawing Sheets

(51) Int. Cl.
*F02B 21/00* (2006.01)
*F02B 29/00* (2006.01)
*F02B 33/34* (2006.01)
*F02B 37/04* (2006.01)
*F02B 37/12* (2006.01)
*F02B 39/04* (2006.01)
*F02B 39/12* (2006.01)
*F02D 35/02* (2006.01)
*F02D 41/00* (2006.01)
*F02B 37/007* (2006.01)
*F02B 37/16* (2006.01)
*F02B 37/18* (2006.01)
*F02M 23/00* (2006.01)
*F02N 11/04* (2006.01)

(52) U.S. Cl.
CPC .............. *F02B 33/34* (2013.01); *F02B 37/007* (2013.01); *F02B 37/04* (2013.01); *F02B 37/127* (2013.01); *F02B 37/16* (2013.01); *F02B 37/18* (2013.01); *F02B 39/04* (2013.01); *F02B 39/12* (2013.01); *F02D 35/023* (2013.01); *F02D 41/0007* (2013.01); *F02M 2023/008* (2013.01); *F02N 11/04* (2013.01); *Y02T 10/146* (2013.01); *Y02T 10/144* (2013.01); *Y02T 10/18* (2013.01)

(56) References Cited

U.S. PATENT DOCUMENTS

| | | | |
|---|---|---|---|
| 3,765,180 A | 10/1973 | Brown | |
| 3,963,379 A | 6/1976 | Ueno | |
| 5,529,549 A | 6/1996 | Moyer | |
| RE37,603 E * | 3/2002 | Coney | ............................ 60/595 |

FOREIGN PATENT DOCUMENTS

| | | | | |
|---|---|---|---|---|
| DE | 10 2004 057 439 A1 | 6/2006 | | |
| DE | 10 2007 033 693 A1 | 1/2009 | | |
| EP | 0 503 139 A2 | 9/1992 | | |
| FR | 2 865 769 | 8/2005 | | |
| FR | 2 901 846 A1 | 12/2007 | | |
| GB | 2371087 A * | 7/2002 | ............. F02D 13/06 | |
| GB | 2 402 169 | 12/2004 | | |
| JP | 5 157008 A | 6/1993 | | |
| WO | WO 2005/113947 A1 | 12/2005 | | |
| WO | WO 2006/089779 | 8/2006 | | |
| WO | WO 2007/020524 | 2/2007 | | |
| WO | WO 2009/036992 A1 | 3/2009 | | |

* cited by examiner

(dashed: not for claims 1 & 2)

TURBOCHARGED RECIPROCATING PISTON ENGINE HAVING A CONNECTED PRESSURE TANK FOR BRIDGING TURBO LAG, AND METHOD FOR OPERATING SAID ENGINE

BACKGROUND OF THE INVENTION

1. Field of the Invention

The present invention relates to an improved supercharged internal combustion engine which operates using the four stroke cycle and has a compressed air tank for the purpose of bridging turbo lag.

2. Discussion of Related Art

Reciprocating piston engines were invented more than 100 years ago and have been developed continuously since then, but their maximum degree of efficiency is subject to thermodynamic limits. If a reciprocating piston machine were operated constantly at its maximum degree of efficiency, approximately only half as much fuel would have been burned worldwide as is actually the case today. The main reason for the inefficient utilization of contemporary reciprocating piston engines is that the engine is usually operated only at part load (city traffic, constant speeds, . . . ), where the degrees of efficiency are poor. Since car drivers demand vehicles with a high maximum performance, the result is a high proportion of part load operation and therefore relatively high fuel consumption figures.

The simplest and least expensive solution concept for this problem is the use of reciprocating piston engines with a smaller cubic capacity, since they have a high degree of efficiency in most driving situations. In order that the desire for maximum performance by the car drivers is taken into consideration, said small reciprocating piston engine can be supercharged with the aid of a turbocharger which utilizes the exhaust gas enthalpy; the performance of a reciprocating piston engine with twice as large a cubic capacity can thus be achieved without it being necessary again to sacrifice the achieved gains in the degree of efficiency in the load range described.

This concept is simple and inexpensive and is already also partially used by car companies. However, in the case of this concept, specifically if applied to gasoline engines (it is standard in diesel engines), there is a reason why it is used rarely: what is known as "turbo lag": when the driver requests acceleration at low rotational speeds of the supercharged reciprocating piston engine, there is a lack of air in the supercharged system, which results in poor response behavior.

This problem can be eliminated by the connection of a compressed air tank to the cylinders (=combustion chambers): if a great torque is requested by the driver, additional air can be introduced directly (!) into the combustion chambers by opening of the charging valve, in addition to the air which has already been introduced via the inlet valves. This additional air makes it possible to inject more fuel for the corresponding cycle (the 4 strokes of the reciprocating piston engine: intake of fresh gas—compression—combustion/expansion—ejection of the burned gases). As a result, not only is a higher torque produced in an instant for combustion, but also an increased exhaust gas enthalpy flow which drives the turbine and therefore also the compressor of the turbocharger. The compressor therefore compresses more air to a higher pressure level. The increased pressure on the inlet side of the reciprocating piston engine leads to more air entering the reciprocating piston engine during the inlet operation, whereby the "vicious circle of the lack of air" (engine first of all produces little torque; produces little exhaust gas enthalpy as a result; as a result, the turbocharger is not driven sufficiently; the compressor of the turbocharger delivers little fresh air; as a result, only a limited air mass passes into the combustion chambers; only a limited fuel quantity can thus be injected and, as a consequence, only little torque can be produced; . . . ) is interrupted. As a result, the additionally introduced air from the compressed air tank is necessary only for a short time period. As soon as the turbocharger has reached high rotational speeds, it supplies sufficient air for the production of the maximum torque.

The connection of a pressure tank to the combustion chambers of a reciprocating piston engine (called "pneumatic hybridization" in the following text) serves the purpose in many patents and scientific publications of it being possible to recuperate energy which becomes available during braking and is dissipated in conventional vehicle brakes by pumping and storing air in the compressed air tank (without the introduction of fuel). This compressed air can be used at another instant, at which the reciprocating piston engine is driven exclusively by air (without the introduction of fuel). A pneumatic start is thus also made possible. However, these advantages are secondary, as numerous examinations have shown (publication list at www.hpe.ethz.ch). The concept described in the preceding paragraph is responsible for a fuel saving of approximately 25%, whereas the advantages which are described in this paragraph raise the saving merely overall to approximately 32%. The present invention therefore concentrates on the pneumatic hybridization for bridging the turbo lag.

Overview of relevant existing patents with respect to the prior art in the field of pneumatic hybridization, sorted in time terms from old to new:

U.S. Pat. No. 1,013,528 is the first patent about a pneumatic hybrid engine. Here, a reciprocating piston engine is additionally used as compressed air expansion engine. The pneumatic engine start is likewise described. The compressed air tank is charged as soon as two cylinders are combusting and two cylinders are pumping; charging of the tank by utilization of the energy released during braking is not provided.

U.S. Pat. No. 3,765,180 likewise describes a reciprocating piston engine which can be operated both as an internal combustion engine and as a pneumatic motor. An external electric compressor is used to produce compressed air.

U.S. Pat. No. 3,963,379 is based partly on U.S. Pat. No. 1,013,528, but the brake energy can be used here to produce compressed air (pumping in the two stroke cycle). The patent provides axially adjustable camshaft profiles for all inlet, outlet and charging valves which make operation possible as an internal combustion engine, pump and pneumatic motor. Here, the charging valve is always actuated via one of three cam profiles: a zero cam which keeps the valve closed, a double cam for the two stroke pumping cycle and a single cam for the engine start, which single cam opens the charging valve when the expansion or combustion stroke takes place in the combustion cycle. Moreover, the described reciprocating piston engine functions in both rotational directions.

U.S. Pat. No. 5,529,549 is the first patent for a pneumatic hybrid engine, in which the use of an engine control unit is provided for actuating the valves on the basis of sensor signals. In addition, the patent describes (as first patent) a "supercharged" mode which is possible for this (non-turbocharged) engine. Here, air from the pressure tank is used exclusively to fill the engine; no air from the surroundings (normal inlet path) is used, and the fuel is injected directly into the combustion chamber. More air can therefore pass into the cylinder and more fuel can be injected compared with a normal internal combustion engine. The construction provides controllable valves which connect the inlet channel either to compressed air, to the inlet path (from the surroundings) or even not at all; a volume therefore exists which is used alternately by the inlet path and by the high pressure path on the way to the combustion chamber. The engine additionally provides a pneumatic motor mode, a normal combustion mode, a pump mode and a cylinder deactivation mode. No fluid-dynamic device for charging the engine is provided for the engine.

GB2402169 describes a reciprocating piston engine which, in addition to the combustion mode, also makes a pump mode and a pneumatic motor mode possible (two stroke and four stroke modes). For the pneumatic motor mode, a method is described, in which the expanded air is pushed out toward the inlet, in order that the air does not cause any problems for the catalytic converter operation. All the valves are actuated in a fully variable manner (electrohydraulically) and make it possible that various cylinders are operated in different modes. In addition, it describes what is also called "air power assist (APA) mode" in scientific publications. During an inlet stroke, first of all air is introduced via the inlet valve and subsequently air from the pressure tank is added during the same inlet stroke.

FR2865769A1 describes a reciprocating piston engine which is supercharged with a turbocharger and in which the pneumatic hybridization is used to bridge the turbo lag. The "supercharged" mode used for this purpose differs here from the "supercharged" mode in U.S. Pat. No. 5,529,549 in that the inlet path and the pressure tank path do not jointly utilize any volume on the way to the combustion chamber. Moreover, first of all here air is let out of the inlet and subsequently air is let out of the pressure tank. In contrast to GB2402169, the air from the pressure tank is not introduced here during the inlet stroke, but rather during the compression phase of the cylinder. Fully variable valve control systems are used for all valves; the pneumatic motor mode and pump mode are thus made possible in each case in the two stroke process.

WO2009/036992 describes, like FR2865769A1, a reciprocating piston engine which is supercharged with a turbocharger and in which the compressed air tank is connected directly to the combustion chambers with the aid of fully variable, preferably electrohydraulically actuated charging valves. In contrast, the inlet and outlet valves are driven via camshafts which always have the same lift profile during every four stroke cycle. The pump mode and pneumatic motor mode can therefore be operated in the four stroke process. In addition, the charging valve serves to make the "supercharged" mode possible analogously to FR2865769A1, in order to bridge the turbo lag. In a further embodiment, an exhaust gas pressure tank is used in addition to a compressed air tank. The exhaust gas tank is used for a new combustion cycle, in which gases burned at the end of the expansion are transferred into the exhaust gas tank. The pressurized exhaust gases can be used for a pneumatic motor mode in the four stroke process.

SUMMARY OF THE INVENTION

The invention aims at the most important advantage of the pneumatic hybridization of reciprocating piston engines, which advantage has already been described above: the substantial reduction of the cubic capacity of a reciprocating piston engine with retention of the nominal power output with the aid of a turbocharger, as a result of the bridging of the turbo lag by means of compressed air which is introduced directly into a combustion chamber.

High variability of actuating systems of valves represents a high hurdle for car manufacturers, since complexity and therefore costs rise in comparison with a conventional reciprocating piston engine. This was solved in EP 07018673.9 by the use of conventional, non-variable camshafts for all the inlet and outlet valves. The fully variable charging valve actuation which is still necessary there is avoided in the present patent by a camshaft-based system also being used for the charging valves.

In a first embodiment of the invention (basic embodiment, or embodiment 1), the charging valve is actuated by way of a fixed camshaft profile, but the mechanical operative connection between the camshaft which is responsible for the charging valves and the charging valve has a mechanism for rapid deactivation or activation (activation mechanism).

Various activation mechanisms on the basis of camshaft systems are inexpensive and are used in production vehicles. The "supercharged" mode similar to EP07018673.9 and FR2865769A1 can thus be made possible. This inexpensive configuration makes bridging of the turbo lag possible in a supercharged engine. All further embodiments are based on this configuration.

However, the turbo lag bridging requires special measures which are substantial for the present invention: by fixing a lift profile for the cam of the charging valve, the air mass in the cylinder can no longer be fixed sufficiently by the charging valve controller. Here, for gasoline engines, the air mass in the cylinder is proportional to the torque which can be generated, since said engines always require a near-stoichiometric fuel/air mixture in order to use a 3-way catalytic converter for exhaust gas aftertreatment. The air mass in the cylinder then therefore has to be regulated via an electronically or electromechanically actuable throttle valve. The engine control unit (part of the reciprocating piston engine) receives a desired torque via a pedal displacement transducer, from which desired torque a fuel quantity which is required for the instantaneous state of the reciprocating piston engine is calculated. The air quantity which is necessary for the stoichiometric combustion of the fuel is calculated from this. If the air mass which is available via the inlet valves is not available in the instantaneous state of the reciprocating piston engine for the relevant engine cycle, the engine control unit automatically sends commands for the activation of the respective charging valve to the throttle valve/valves and to the respective fuel injection unit, with the result that a virtually stoichiometric combustion mixture is achieved after the closure of the charging valve. In the case of port injection, a very rich mixture (that is to say, a high fuel excess) is introduced into the cylinder during the opening phase of the inlet valves, and only the additional air from the compressed air tank ensures a near-stoichiometric (or at least combustible) mixture.

BRIEF DESCRIPTION OF THE DRAWINGS

Figure 1:
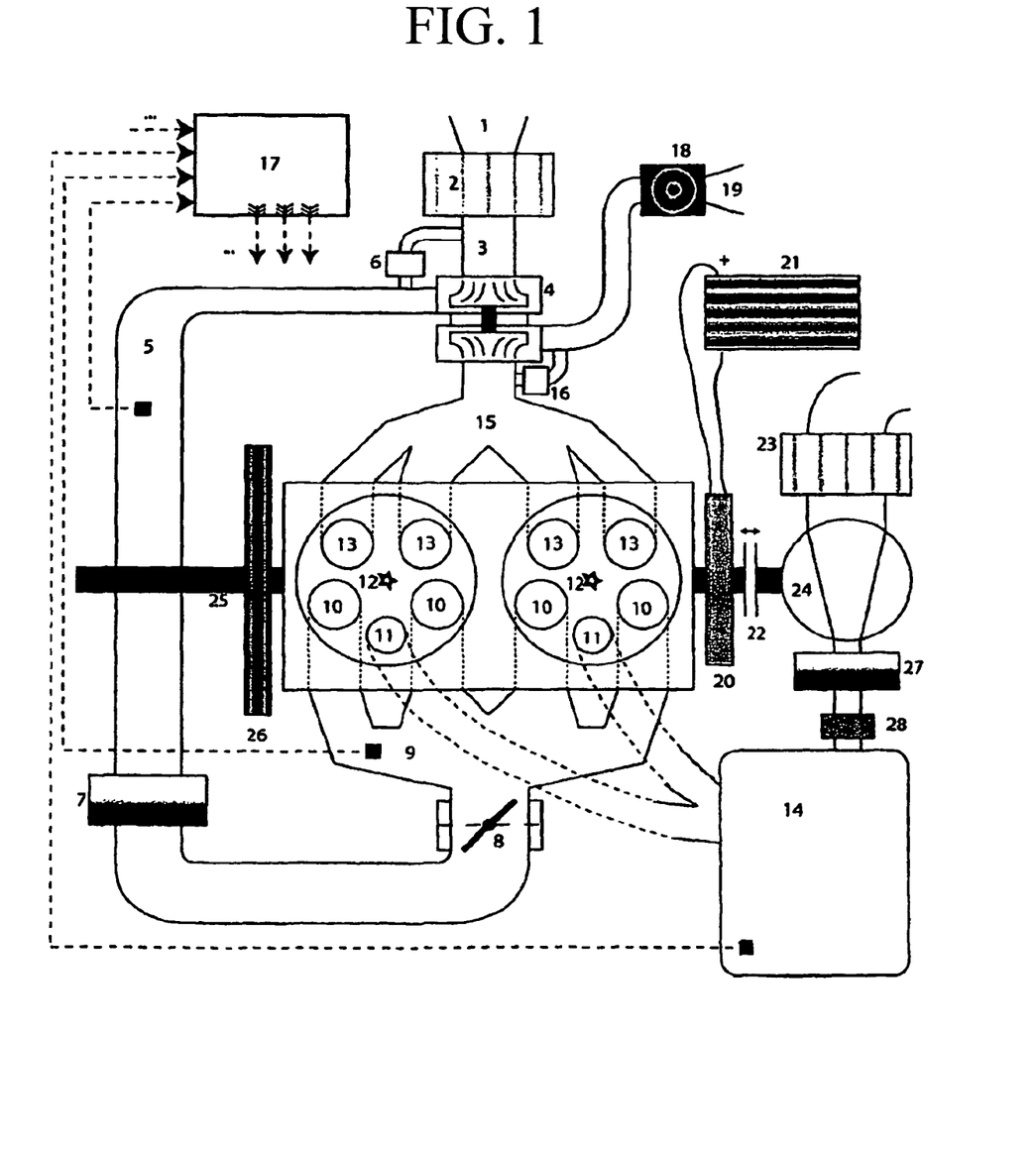
FIG. 1 shows an overall concept of a reciprocating piston engine according to the invention.
Figure 2:
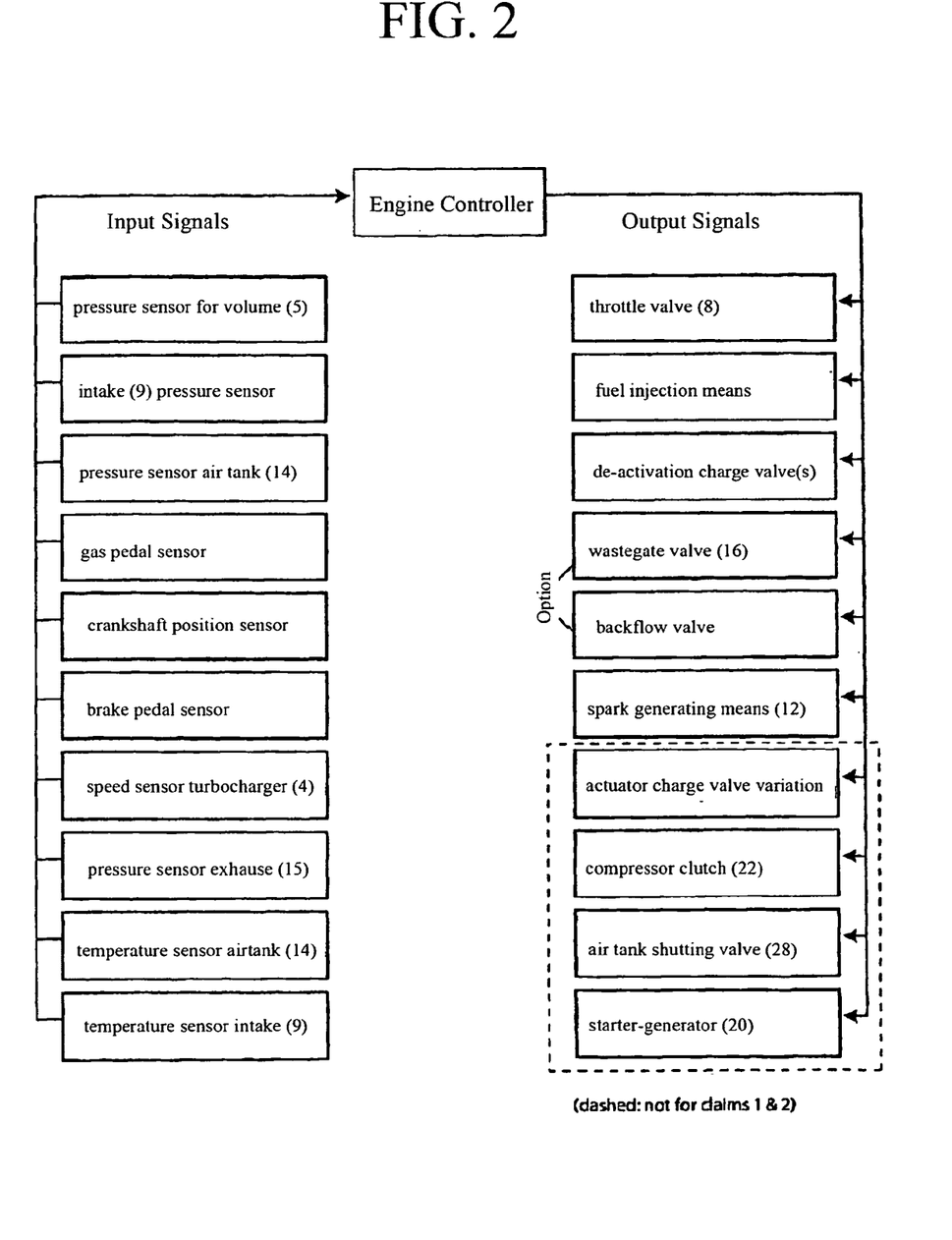
FIG. 2 shows a diagram relating to the method of operation of an engine control unit, and also sensors and actuators.
Figure 3:
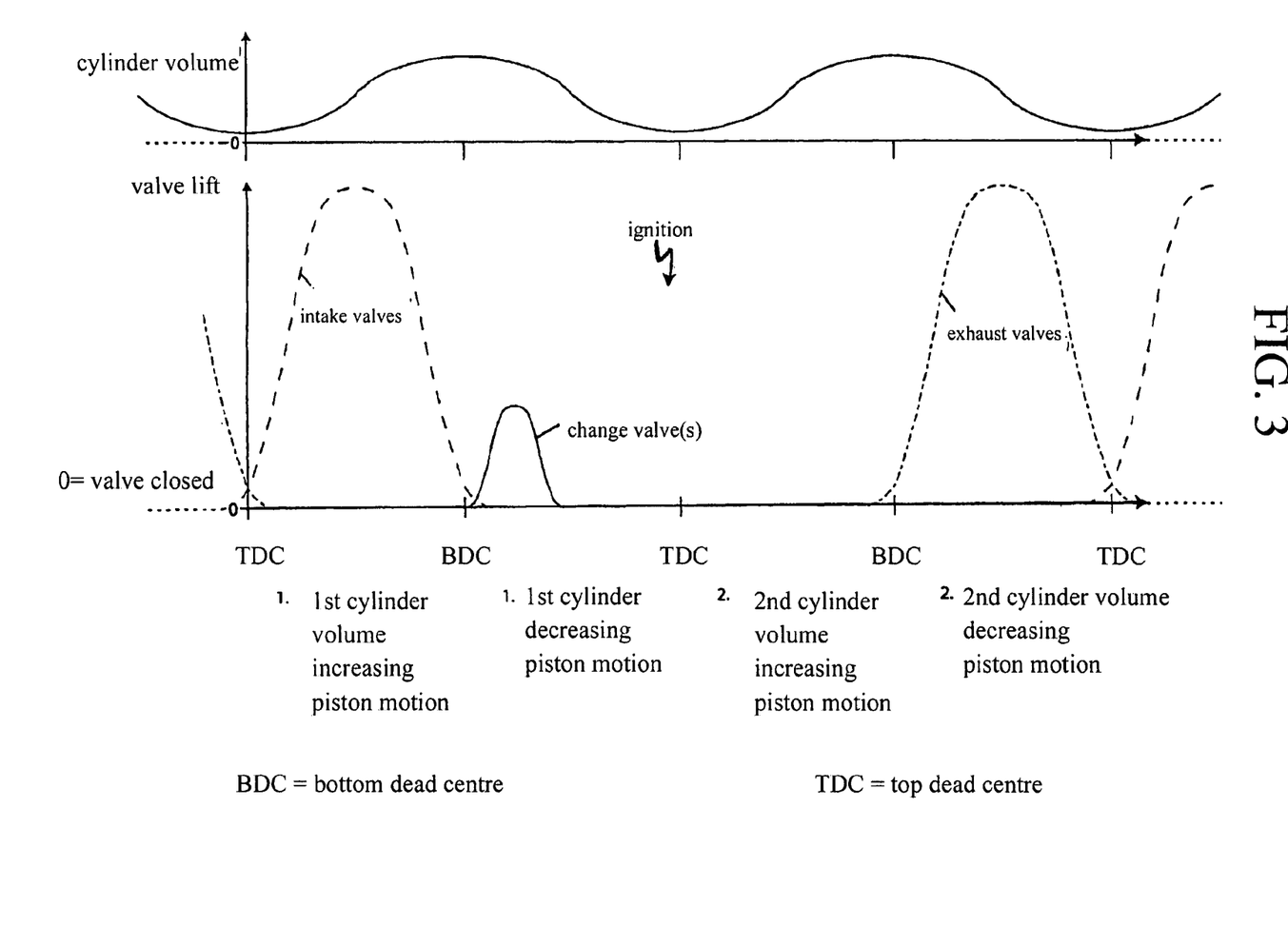
FIG. 3 shows a first diagram with a movement profile of the inlet, outlet and charging valves.
Figure 4:
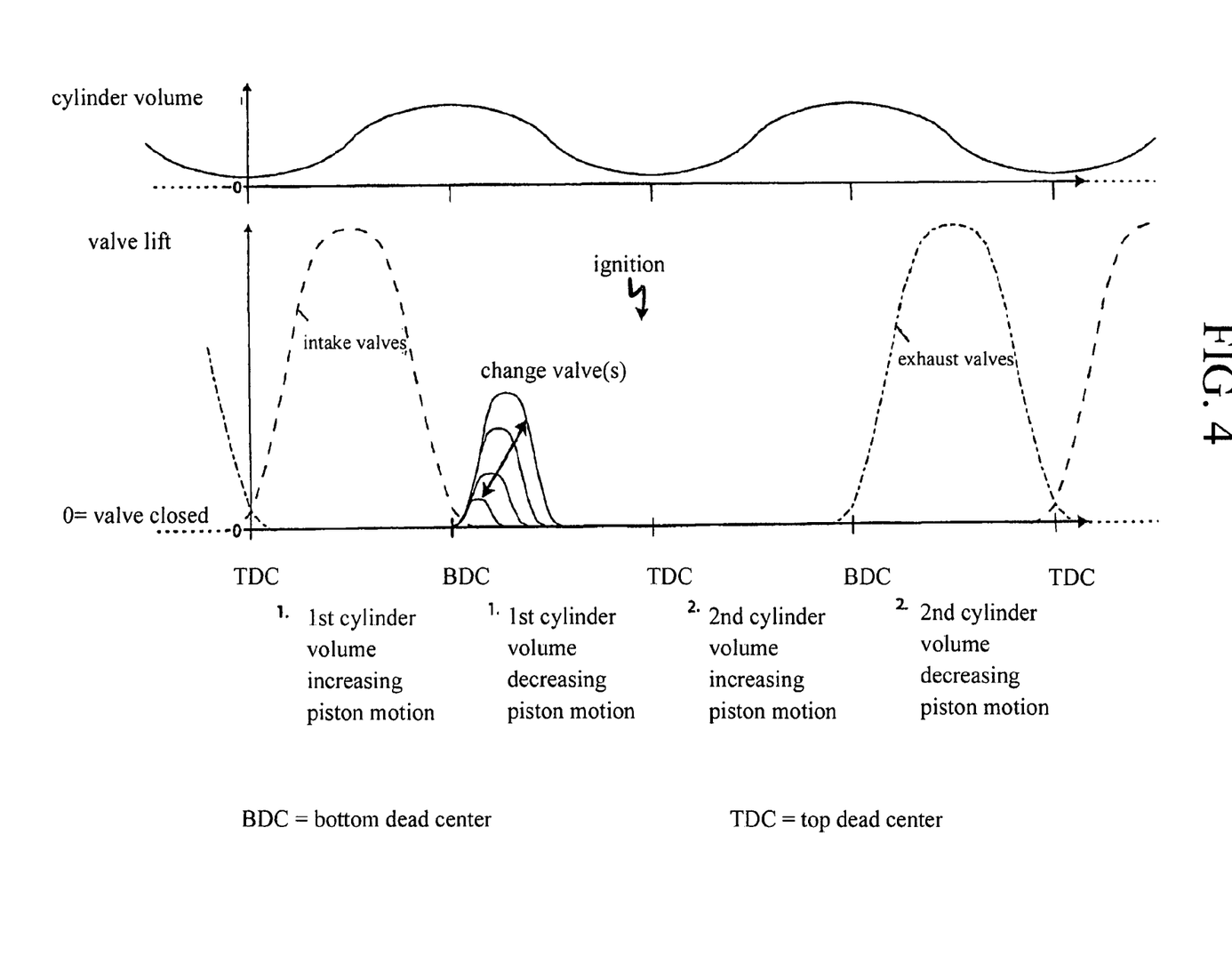
FIG. 4 shows a second diagram with a movement profile of the inlet, outlet and charging valves.
Figure 5:
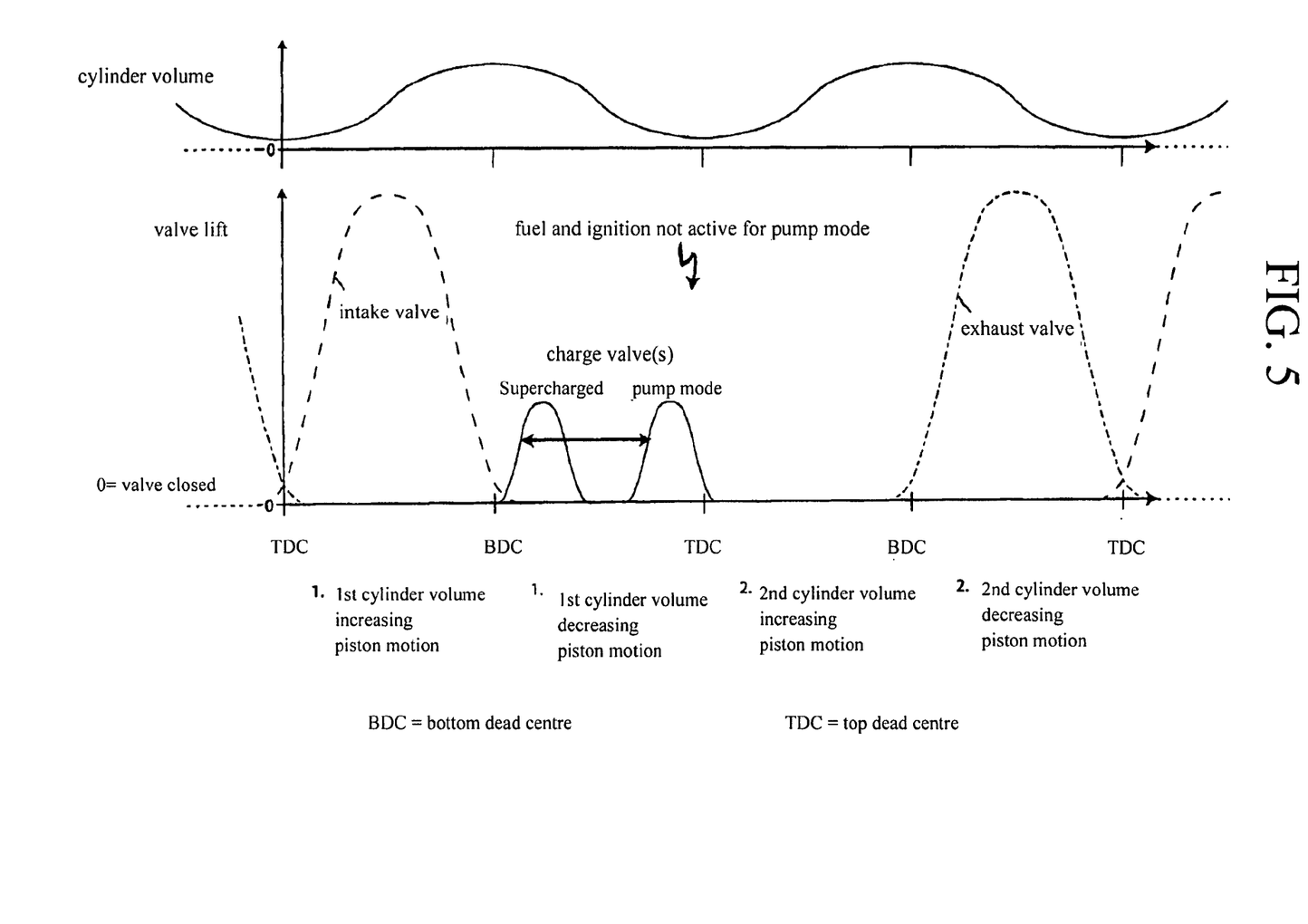
FIG. 5 shows a third diagram with a movement profile of the inlet, outlet and charging valves.
Figure 6:
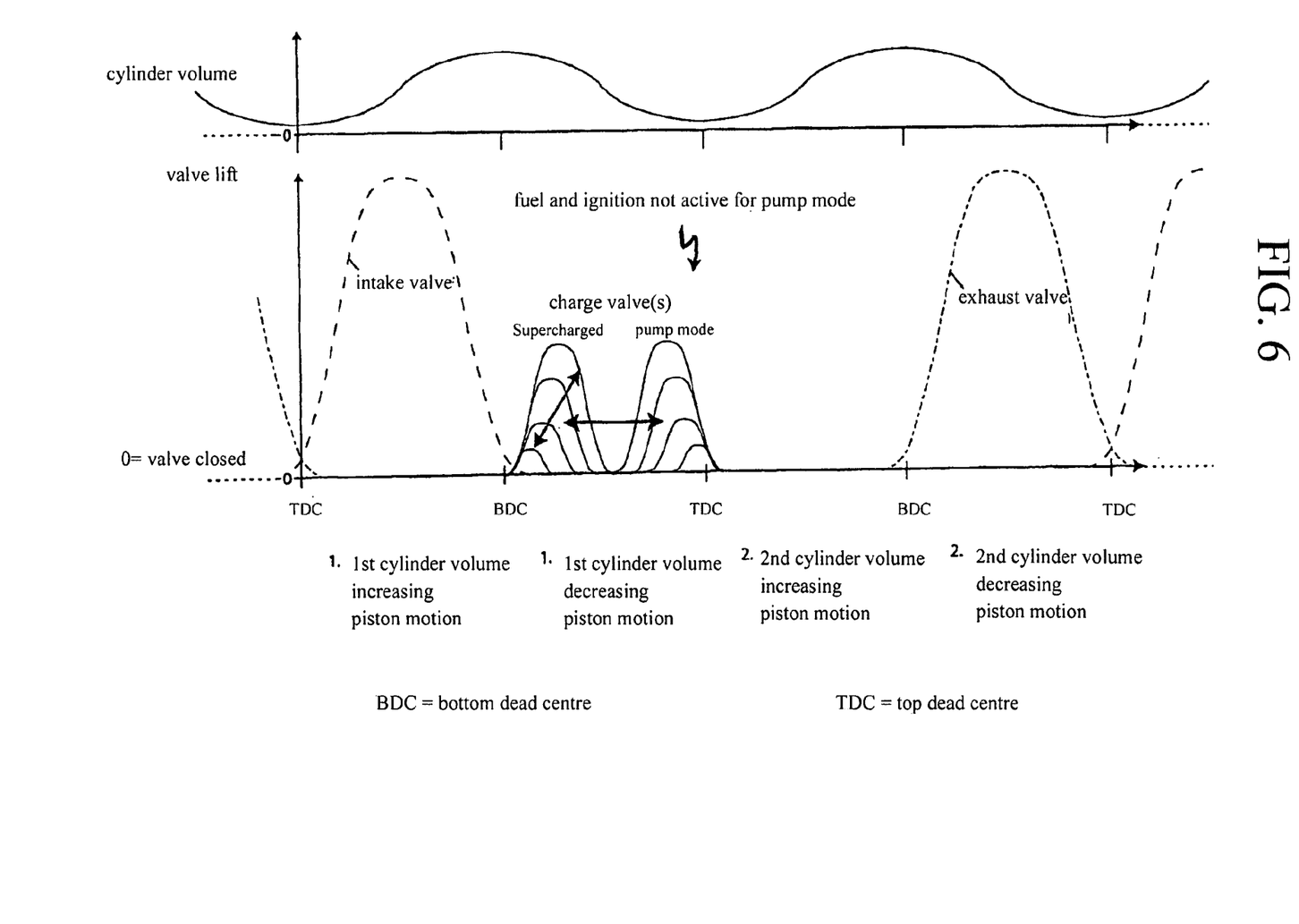
FIG. 6 shows a fourth diagram with a movement profile of the inlet, outlet and charging valves.

The invention will be explained in greater detail using the embodiments which are shown in the following figures, in which:

FIG. 1 shows the overall concept of a reciprocating piston engine according to the invention. FIG. 2 shows the associated engine control unit with sensors and actuators.

The embodiments described below differ substantially in terms of the complexity of the valve control of the charging valves. FIG. 3, FIG. 4, FIG. 5 and FIG. 6 show this variability of the charging valves for the various embodiments.

DESCRIPTION OF PREFERRED EMBODIMENTS

Embodiment 1 (FIG. 3): the air path runs as follows: the air is sucked in from the surroundings (1) and is cleaned by an air filter (2). The fluid-dynamic compressor of the turbocharger (4) compresses the air and delivers it into the next volume in the air path (5). If the pressure ratio between the volume (5) and that in front of the compressor (3) is too great (which is calculated with consideration of the air mass flow through the compressor), the overflow valve (6) is used to guide a defined air mass flow back to the volume (3), said overflow valve either functioning mechanically (as a function of the pressure difference), or else preferably being actuated electronically via the engine control unit (17). The air which is compressed by the compressor is cooled with the aid of a charge air cooler (air/water or air/air), in order to increase the density of the compressed air. The cooled air is throttled by an electronically or electromechanically actuable throttle valve (8), with the result that the pressure in the following inlet volume (9) is as a rule lower than or equal to that in the volume in front of the throttle valve. This part of the air path can be divided into a plurality of parallel paths with possibly a plurality of turbochargers, throttle valves and inlet volumes. The inlet valves (10) are actuated via a camshaft, with the result that all the inlet valves have precisely one opening and closing operation per two revolutions of the crankshaft (25). The inlet valves are in each case open mainly during a piston movement which increases the volume. The reciprocating piston engine has devices for the metering injection of fuel; preferably one device of this type is used per cylinder. The devices are either situated in the inlet channels or they are placed in the cylinder head in such a way that they can inject the fuel directly into the combustion chambers (not shown). If the reciprocating piston engine uses gasoline as fuel, each combustion chamber has an ignition spark generating unit (12). All the outlet valves (13) are likewise driven via a camshaft, to be precise each outlet valve is driven in each case once per two revolutions of the crankshaft. The outlet valves connect the combustion chambers to an outlet volume (15) which is in turn connected to the turbine of the turbocharger (4), with the result that the enthalpy flow through the turbine drives the latter which is situated on a shaft with the compressor of the turbocharger. The turbocharger can have a variable turbine geometry (not shown) or what is known as a wastegate (16) which can conduct gases past the turbine as soon as said wastegate (16) is actuated correspondingly, mechanically or electromechanically. The gases which are flowed through the turbine and the wastegate are guided through a catalytic converter (18) (gasoline engine: 3-way catalytic converter) before they flow out into the surroundings (19). Like the inlet air path, the exhaust gas path can be divided in parallel with a plurality of outlet volumes and turbochargers. In braking phases or also if the engine control unit (17) demands it, a compressor (24) can be connected to the crankshaft (25) via an electronically switchable clutch (22). Here, the compressor sucks in surrounding air via a filter (23) and delivers the compressed air into the compressed air tank (14). The compressed air can possibly be cooled via a cooling device (27). A valve (28) prevents the return flow of air from the compressed air tank (14) which is connected directly to the combustion chambers via the charging valves (11). For these embodiments, the charging valves are actuated via a camshaft which is connected mechanically to the crankshaft in such a way that said camshaft rotates half as quickly as said crankshaft. The cams of said camshaft drive the charging valves in such a way that the charging valves are opened approximately at the beginning of the compression when the respective inlet valves have just closed or are virtually closed. The charging valves close in each case during the respective compression operation. The mechanical connection of the camshaft to the charging valves can be deactivated rapidly, that is to say at most within 10 revolutions of the crankshaft; the activation and deactivation operations are initiated by the engine control unit (17).

Embodiment 2 (FIG. 4): this embodiment differs from embodiment 1 merely in terms of the variability of the charging valve actuation. Here, the mechanical connection of the charging valves and the camshafts which actuate the charging valves can not only be deactivated, but rather the lift profile of the charging valves can be changed in such a way that the maximum stroke of the charging valves and the stroke duration (in relation to the crank angle difference) can be changed. This can be realized by way of mass production compatible technologies such as Valvetronic from the company BMW AG. The opening instant of the charging valves preferably remains unchanged. This embodiment permits more precise control of the air mass which is situated in the combustion chamber before initiation of the combustion.

Embodiment 3 (FIG. 5): this embodiment differs from embodiment 1 in terms of the variability of the charging valve control and the omission of the external compressor (24) and its required components (23), (27), (28) and (22). Here, in comparison with embodiment 1, the mechanical connection of the charging valves and the camshafts which actuate the charging valves can not only be deactivated, but the lift profile of the charging valves can also be phase shifted in such a way that the charging valves are open toward the end of the compression cycle. This is done if the engine control unit registers a braking request of the driver (for example, pressing of a brake pedal). For this case, the fuel injection is deactivated and the throttle valve is opened fully. Air can thus be pumped into the connected compressed air tank. Phase shifting systems for camshaft-based valve control means can be found frequently in production vehicles (for example, VANOS from the company BMW AG).

Embodiment 4 (FIG. 6): this embodiment differs from embodiment 1 in terms of the variability of the charging valve actuation and the omission of the external compressor (24) and its required components (23), (27), (28) and (22). Here, in comparison with embodiment 1, the mechanical connection of the charging valves and the camshafts which actuate the charging valves can not only be deactivated, but the lift profile of the charging valves can also be phase shifted, with the result that the charging valves are open toward the end of the compression stroke and the lift profile of the charging valves can be changed in such a way that the maximum stroke of the charging valves and the duration of the stroke (in relation to the crank angle difference) can be changed. This can be realized by way of a combination of series production compatible technologies such as Valvetronic and VANOS from the company BMW AG. This embodiment allows more precise control of the air mass which is situated in the combustion chamber ("supercharged" mode) before initiation of the combustion and more precise control of the pump mode, in which the injection of fuel is deactivated.

Comments with respect to the embodiments: embodiments 1 and 2 permit the "supercharged" mode in addition to the normal internal combustion engine mode, whereas a recovery of energy which is released during braking of the vehicle can be brought about by means of an external compressor. Embodiments 3 and 4 do not require an additional compressor (it is to be provided optionally here), since, in addition to the "supercharged" mode, they can also produce a pump mode on the four stroke basis. It is important for the "supercharged" mode that hot air is not injected, but rather air which is as cold as possible. This can be achieved by the fact that the tank is manufactured from metal and is designed for satisfactory heat transfer to the surrounding air (large surfaces); in addition, the air which emerges from the external compressor can also be cooled (similar to charge air coolers as in the inlet section). It should additionally be ensured that the charging valve (and the volume in front of the charging valve) is not heated to too pronounced an extent. It is therefore possible for all the embodiments to incorporate the charging valve into the engine cooling system (water cooling around the volume and/or the feed channel to the charging valve), or the charging valve is arranged between two inlet valves.

The invention does entirely without the pneumatic motor mode. The pneumatic motor mode would increase the requirements placed on a variable valve control means in such a way that a camshaft-based solution for all the valves could no longer be brought about. Moreover, the use of the pneumatic motor mode represents a disadvantage if inlet valves and outlet valves cannot be actuated in a variable manner, since an excess of air in the exhaust gas section, as occurs in the use of the pneumatic motor mode, can impair the functional capability of a 3-way catalytic converter.

Since the pneumatic starting of the reciprocating piston engine has to be dispensed with, another solution may be suitable: an electric starter generator (20) can be attached to the crankshaft, as is already installed in series production in some vehicles. Said starter generator replaces a small conventional starter and can accelerate the reciprocating piston engine from a standstill to a rotational speed suitable for the combustion so quickly that, instead of idling operation of the reciprocating piston engine, the engine can be switched off as soon as the vehicle comes to a standstill. A starter generator of this type is connected to the vehicle battery (21). The starter generator can possibly also output an additional positive torque to the drive train during driving in order to assist the engine. This can be used, above all, to make the turbo lag bridging operation smoother (that is to say, a reduction in the torque jump upon activation or deactivation of the charging valve). The starter generator can additionally convert kinetic energy of the drive train into electrical energy (negative torque at the crankshaft). This makes the further recuperation of energy possible which is released during braking of the vehicle. In the case of embodiments 3 and 4, possibly not the entire released energy which is available during braking can be recuperated with the aid of the pump mode on a four stroke basis; the electrical recuperation is a satisfactory addition here. The electrically stored energy is used preferentially for operating electronic consumers in the vehicle. In addition, in the case of a low battery level, the battery can be recharged, by the reciprocating piston engine outputting a positive torque to the crankshaft, with the result that the excess torque can be used to generate electrical energy.

The "supercharged" mode is very sophisticated in terms of regulating technology and requires the above-described sensor-/engine control unit-/actuator architecture. It is additionally activated only if the engine control unit can calculate, with the aid of the air tank pressure sensor signal, that the tank pressure during the opening of the charging valve for the current engine cycle will always be greater than the cylinder pressure, and the transfer of combustible fuel/air mixture into the compressed air tank can therefore be prevented. This check can take place, for example, by using cylinder pressure sensors. During bridging of the turbo lag, the pressure in front of the throttle valve increases as a result of the spooling up of the turbocharger, with the result that the throttle valve has to regulate the pressure difference of the volume (5) and the inlet volume (9) in such a way that the desired air mass is situated there after the air is blown in from the pressure tank, which desired air mass can combust the fuel virtually completely (in the case of a near-stoichiometric ratio) in order to produce the torque which is desired by the driver. As soon as the pressure in front of the throttle valve is high enough to fill the cylinders with sufficient air, the throttle valve is opened and the charging valves are deactivated again. During the turbo lag bridging, high pressure ratios across the compressor can occur, with relatively low air mass flows (since part of the required air comes from the pressure tank after all). The wastegate valve therefore has to be regulated in such a way that the compressor does not exceed the surge line.

In principle, the invention which is described is also an advance for diesel engines. Here, the turbo lag to be bridged is not so great, but nevertheless the drivability of the vehicle can be improved. In the diesel, the air mass is of secondary significance; diesel engines are always operated with a lean mixture. However, blowing in additional compressed air possibly makes a reduced production of soot and a higher possible injection quantity possible directly after the driver requests the increased torque. Diesel engines do not have any ignition spark generating units in the cylinder head; they are compression ignition engines. Otherwise, the description of the invention likewise applies to diesel engines.

In one embodiment, the invention relates to a reciprocating piston engine with a plurality of cylinders (cylindrical combustion chambers), the pistons of which are connected mechanically to a common crankshaft (25), having    a. in each case at least one inlet valve (10) per cylinder,    b. in each case at least one outlet valve (13) per cylinder,    c. an (optionally divided) inlet volume (9) which can be connected to the respective cylinder volume by opening of the respective inlet valves (10),    d. an (optionally divided) outlet volume (15) which can be connected to the respective cylinder volume by opening of the respective outlet valves (15),    e. at least one camshaft, mechanically connected to the crankshaft and the inlet and outlet valves (10, 13) in such a way that the inlet and outlet valves are opened and closed in each case once per two reciprocating cycles of the associated cylinder,    f. a device for the metered injection of fuel into the cylinders,    g. one ignition spark generating unit per cylinder,    h. at least one fluid-dynamic device (turbocharger, 4) for increasing the pressure in a volume (5) in front of the inlet volume (9), driven by the exhaust gas enthalpy of the reciprocating piston engine,    i. a device for cooling the compressed air (7),    j. at least one electrically or electromechanically controlled throttle valve (8) which can reduce the pressure in the inlet volume (9) in comparison with the pressure of the volume (5), through which flow has previously passed,    and characterized in that at least one cylinder additionally also contains at least one charging valve (11) which connects the associated cylinder to an (optionally divided) compressed air tank (14) and which is likewise connected to a camshaft which is connected mechanically to the crankshaft, in such a way that it is opened during two reciprocating cycles of the associated cylinder when the inlet valve which belongs to the cylinder is in the process of the closing operation or is already closed, and is closed again before the associated piston has completed the movement which reduces the cylinder volume, and in such a way that the charging valve can have its mechanical connection to the crankshaft deactivated by a mechanism, with the result that it remains closed during two or more reciprocating cycles.

The reciprocating piston engine can be operatively connected to an engine control unit (17) which, from the input variables
   requested torque,
   air pressure in the compressed air tank (14),
   air pressure in the volume (5) which is situated in front of the throttle valve (8), and
   the expected opening times of the valves which are connected mechanically to the crankshaft, which opening times are determined, for example, by a crankshaft position sensor,
   or from variables derived from the above, calculates
   how far the throttle valve (8) has to be opened,
   whether the charging valves have to be activated, and
   how much fuel has to be injected,
   with the result that the corresponding quantity of a stoichiometric or near-stoichiometric fuel/air mixture is produced, which mixture produces the requested torque upon combustion and which correspondingly actuates
   the throttle valve (8),
   the respective mechanical, deactivatable connection of the charging valve to the crankshaft, and
   the device for the metered injection of fuel into the cylinders.

Furthermore, the reciprocating piston engine can have a preferably electronically controllable overflow valve (6) at the fluid-dynamic device (compressor of the turbocharger, 4), with the result that compressed air can flow back in the case of an excessively high pressure in the volume (5) in front of the inlet volume (9) in front of said fluid-dynamic device (3).

The reciprocating piston engine can additionally have a compressor (24) which
   a. can be connected to the crankshaft via a deactivatable clutch (22),
   b. is connected at an outlet to the compressed air tank (14).

The reciprocating piston engine can have a switchable valve (28) which connects the compressed air tank (14) to the compressor (24).

The reciprocating piston engine can have a cooling device (27) for cooling the air which is compressed by the compressor (24).

The reciprocating piston engine can have a charging valve (11) with a variable lift profile, it being possible for the lift profile to be varied by phase shifting of the camshafts in such a way that, depending on the setting of the variation, the charging valve is either opened closer to the bottom dead center of the respective cylinder, with the result that the air pressure in the respective cylinder during the opening duration of the charging valve is lower than in the compressed air tank, or else is situated in the closing operation closer to the top dead center of the respective cylinder, with the result that the air pressure in the respective cylinder during the opening duration of the charging valve is greater than in the compressed air tank.

In one embodiment of the reciprocating piston engine, the duration and maximum lift of the lift profile of the charging valve (11) can be varied, with the result that the transferred air quantity between the cylinder and the tank can be set.

In one embodiment of the reciprocating piston engine, each cylinder with a charging valve (11) can have at least two inlet valves (10), and the charging valve can be positioned in such a way between the inlet valves that the thermal influence of the gases which flow through the outlet valves (13) on the air which is situated in front of the charging valves (11) is reduced.

In one embodiment of the reciprocating piston engine, the ignition spark generating unit (12) can be removed and fuel can be injected only near the top dead center, the controller not setting the required air and fuel quantities to a lambda value of approximately 1, but rather to a lambda value of greater than 1.1.

In one embodiment, the invention comprises a method for operating a reciprocating piston engine, which method runs through the following cycle in at least one cylinder:
   a. sucking in of fresh air or fuel/air mixture during a first piston movement which increases the cylinder volume,
   b. compressing of the gases which are situated in the cylinder during a first piston movement which reduces the cylinder volume,
   c. ignition of the fuel/air mixture close to the top dead center after said first piston movement which reduces the cylinder volume,
   d. expansion and work phase of the cylinder, in which the gases which are situated in said cylinder combust (second piston movement which increases the cylinder volume),
   e. ejection of the burned gases in a second piston movement which reduces the cylinder volume,
   and with the charging valve (11) being opened near the start of the first piston movement which reduces the cylinder volume, and additional compressed air being blown out of the compressed air tank (14) into the cylinder, and the throttle valve (8) and the device for the metered injection of fuel previously being actuated in such a way that a near-stoichiometric combustion mixture is produced before the mixture is ignited close to the top dead center, that is to say toward the end of the first piston movement which reduces the cylinder volume.

In the method for operating the reciprocating piston engine, the ignition of the fuel/air mixture can be achieved by auto-ignition upon injection of the fuel close to the top dead center (c) after the first piston movement (b) which reduces the cylinder volume, and air and fuel are measured such that a lean fuel/air ratio (lambda>1.1) is produced.

In the method for operating the reciprocating piston engine, only fresh air, without fuel, can be sucked into the cylinder during the first piston movement which increases the cylinder volume, and the charging valve (11) can be opened toward the end of a following piston movement which increases the cylinder volume, when the pressure in the cylinder during the majority of the opening duration of the charging valve is greater than the pressure in the compressed air tank, with the result that the compressed air tank is charged with air.

In the method for operating the reciprocating piston engine, the clutch (22) can produce a connection between the compressor (24) and the crankshaft (25) when fuel is burned in the cylinders.

In the method for operating the reciprocating piston engine, the clutch (22) can produce a connection between the compressor (24) and the crankshaft (25) when no fuel is burned in the cylinders and the compressor (24) generates a torque on the crankshaft (25), which torque is opposed to the movement of the crankshaft (25), as a result of which the crankshaft (25) is braked.

The invention claimed is:

1. A reciprocating piston engine comprising:
   a. at least one combustion chamber;
   b. a piston which is arranged movably therein and is operatively connected mechanically to a crankshaft (25);
   c. at least one inlet valve (10) and at least one outlet valve (13) positioned within the at least one combustion chamber;
   d. at least one camshaft operatively connecting the at least one inlet valve (10) and the at least one outlet valve (13) to the crankshaft so that the inlet and outlet valves (10, 13) are opened and closed in each case once per two reciprocating cycles of the piston;
   e. at least one fluid-dynamic device (4) which serves to increase a pressure in an inlet volume (9) upstream of the at least one combustion chamber, which inlet volume (9) is operatively connected to the combustion chamber via the at least one inlet valve (10);
   f. a device for the metered injection of fuel operatively connected to the at least one combustion chamber;
   g. at least one throttle valve (8) which serves to influence the pressure in the inlet volume (9),
   h. at least one combustion chamber having a charging valve (11) which operatively connects the at least one combustion chamber to a compressed air tank (14);
   i. the charging valve (11) is operatively connected to the crankshaft via a camshaft; and
   j. an activation mechanism adapted to interrupt a mechanical operative connection between the charging valve and the crankshaft, with the result that the charging valve (11) remains closed during a plurality of reciprocating cycles,
   k. the operative connection of the charging valve (11) to the crankshaft (25) being configured in such a way that the charging valve (11) is opened during two reciprocating cycles of the associated piston when the inlet valve (10) is in the process of the closing operation or is already closed and is closed again before the associated piston has completed the movement which reduces a cylinder volume.

2. The reciprocating piston engine as claimed in claim 1, further comprising:
   a compressor (24) for filling the compressed air tank (14), which compressor (24) is operatively connected to the crankshaft (25) via a clutch (22).

3. The reciprocating piston engine as claimed in claim 1, wherein the fluid-dynamic device (4) is a turbocharger which is driven by the exhaust gas enthalpy of the reciprocating piston engine.

4. The reciprocating piston engine as claimed in claim 1, wherein the charging valve (11) is operatively connected to the crankshaft (25) in such a way that the charging valve (11) is opened during two reciprocating cycles of the associated piston when the inlet valve (10) is in the process of the closing operation or is already closed and is closed again before the associated piston has completed the movement which reduces the cylinder volume.

5. The Reciprocating piston engine as claimed in claim 1, further comprising:
   an ignition spark generating unit (12) operatively connected to the combustion chamber and
   an engine control unit (17) which, from a group of the following input variables:
   a. requested torque,
   b. pressure in the compressed air tank (14),
   c. pressure in a volume (5) which is situated upstream of the throttle valve (8),
   d. opening times of the inlet and outlet valves (10, 13),
   e. or from variables derived therefrom,
   calculates:
   f. how far the throttle valve (8) has to be opened,
   g. whether the charging valves have to be activated, or
   h. how much fuel is required,
   with the result that the corresponding quantity of a stoichiometric or near-stoichiometric fuel/air mixture is produced, which mixture produces the requested torque upon combustion, and which engine control unit (17) correspondingly actuates the throttle valve (8), a respective mechanical, deactivatable connection of the charging valve to the crankshaft and the device for the metered injection of fuel.

6. The reciprocating piston engine claimed in claim 1, wherein fuel is injected close to top dead center, and the reciprocating piston engine has an engine control unit (17) which, from a group of the following input variables:
   a. requested torque,
   b. pressure in the compressed air tank (14),
   c. pressure in a volume (5) which is situated upstream of the throttle valve (8),
   d. opening times of the inlet and outlet valves (10, 13),
   e. or from variables derived therefrom,
   calculates:
   f. how far the throttle valve (8) has to be opened,
   g. whether the charging valves have to be activated, or
   h. how much fuel is required,
   with the result that the corresponding quantity of a fuel/air mixture where a lambda is greater than 1.1 is produced, which fuel/air mixture produces the requested torque upon combustion, and which engine control unit (17) correspondingly actuates the throttle valve (8), the respective mechanical, deactivatable connection of the charging valve to the crankshaft and the device for the metered injection of fuel into the cylinders.

7. The reciprocating piston engine as claimed in claim 1, further comprising:
   an electronically controllable overflow valve (6) on the fluid-dynamic device, with the result that, at a selected pressure in the volume (5) upstream of the inlet volume (9), compressed air can flow back upstream of said fluid-dynamic device (3).

8. The reciprocating piston engine as claimed in claim 1, wherein a lift profile of the charging valve (11) can be varied by phase shifting of the at least one camshaft, in such a way that, depending on the setting of the variation, the charging valve is either opened closer to bottom dead center of a respective cylinder, with the result that air pressure in the respective cylinder during the opening duration of the charging valve is lower than in the compressed air tank, or, however, is situated closer to top dead center of the respective cylinder in the closing operation, with the result that air pressure in the respective cylinder during the opening duration of the charging valve is greater than in the compressed air tank.

9. The reciprocating piston engine as claimed in claim 1, wherein the duration and maximum lift of a lift profile of the charging valve (11) is varied, with the result that a quantity of air transferred between the cylinder and the tank can be set.

10. The reciprocating piston engine as claimed in claim 1, wherein the at least one combustion chamber has the charging valve (11) and at least two inlet valves (10), and in that the charging valve is positioned between the at least two inlet valves (10) in such a way that a thermal influence of the gases which flow through the at least one outlet valve (13) on the air which is situated upstream of the charging valve (11) is minimized.

11. Method for operating a reciprocating piston engine as claimed in claim 1, which method runs through the following cycle in a combustion chamber of the reciprocating piston engine:
   a. intaking fresh air or fuel/air mixture during a first piston movement which increases the cylinder volume,
   b. compressing the gases which are situated in a cylinder during a first piston movement which reduces the cylinder volume,
   c. igniting the fuel/air mixture close to the top dead centre after said first piston movement which reduces the cylinder volume,
   d. expansion and work phase of the combustion chamber, in which the gases which are situated in said combustion chamber burn during a second piston movement which increases the cylinder volume,
   e. ejecting the burned gases in a second piston movement which reduces the cylinder volume;
   characterized in that
   f. the mechanical operative connection between the charging valve (11) and the crankshaft is produced by activating the activation mechanism, with the result that
   g. the charging valve (11) is opened close to the start of the first piston movement which reduces the cylinder volume, and additional compressed air is blown directly out of the compressed air tank (14) into the combustion chamber,
   h. the at least one throttle valve (8) and the device for the metered injection of fuel is previously actuated by the engine control unit in such a way that a near-stoichiometric combustion mixture is produced before the fuel/air mixture in the combustion chamber is ignited close to the top dead centre of the piston.

12. The method as claimed in claim 11, wherein the ignition of the fuel/air mixture being achieved by auto-ignition upon injection of the fuel close to top dead center (c) after the first piston movement (b) which reduces the cylinder volume, and air and fuel being metered such that a lean fuel/air ratio with a lambda value of >1.1 results.

13. The method as claimed in claim 11, wherein only fresh air, without fuel, is sucked into the cylinder during a first piston movement which increases the cylinder volume, and the charging valve (11) is opened toward the end of a following piston movement which decreases the cylinder volume, when the pressure in the cylinder during the majority of the opening duration of the charging valve is greater than the pressure in the compressed air tank, with the result that the compressed air tank is charged with air.

14. The method as claimed in claim 11, wherein a clutch (22) produces a connection between a compressor (24) and the at least one crankshaft (25) when fuel is burned in the at least one combustion chamber.

15. The method as claimed in claim 11, wherein a clutch (22) produces a connection between a compressor (24) and the at least one crankshaft (25) when no fuel is burned in the cylinders and the compressor (24) generates a torque on the at least one crankshaft (25), which torque is opposed to the movement of the at least one crankshaft (25), as a result of which the at least one crankshaft (25) is braked.

16. A reciprocating piston engine comprising:
   a. at least one combustion chamber;
   b. a piston which is arranged movably therein and is operatively connected mechanically to a crankshaft (25);
   c. at least one inlet valve (10) and at least one outlet valve (13) positioned within the at least one combustion chamber;
   d. at least one camshaft operatively connecting the at least one inlet valve (10) and the at least one outlet valve (13) to the crankshaft so that the inlet and outlet valves (10, 13) are opened and closed in each case once per two reciprocating cycles of the piston;
   e. at least one fluid-dynamic device (4) which serves to increase a pressure in an inlet volume (9) upstream of the at least one combustion chamber, which inlet volume (9) is operatively connected to the combustion chamber via the at least one inlet valve (10);
   f. a device for the metered injection of fuel operatively connected to the at least one combustion chamber;
   g. at least one throttle valve (8) which serves to influence the pressure in the inlet volume (9),
   h. at least one combustion chamber having a charging valve (11) which operatively connects the at least one combustion chamber to a compressed air tank (14);
   i. the charging valve (11) is operatively connected to the crankshaft via a camshaft; and
   j. a camshaft activation mechanism adapted to interrupt a mechanical operative connection between the charging valve and the crankshaft, with the result that the charging valve (11) remains closed during a plurality of reciprocating cycles,
   k. the operative connection of the charging valve (11) to the crankshaft (25) being configured in such a way that the charging valve (11) is opened during two reciprocating cycles of the associated piston when the inlet valve (10) is in the process of the closing operation or is already closed and is closed again before the associated piston has completed the movement which reduces a cylinder volume.

* * * * *